Figure 1:
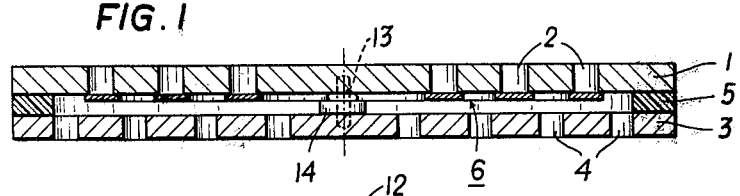

United States Patent [19]

Riedel

[11] 4,164,238
[45] Aug. 14, 1979

[54] CLOSING PLATE FOR A RING VALVE
[75] Inventor: Albert F. Riedel, Schongau, Fed. Rep. of Germany
[73] Assignee: Hoerbiger & Co., Schongau, Fed. Rep. of Germany
[21] Appl. No.: 913,101
[22] Filed: Jun. 6, 1978

Related U.S. Application Data
[63] Continuation of Ser. No. 738,269, Nov. 2, 1976, abandoned.

[30] Foreign Application Priority Data
Nov. 3, 1975 [AT] Austria .................................. 8357/75
[51] Int. Cl.² ............................................ F16K 15/14
[52] U.S. Cl. ........................ 137/512.15; 137/512.4; 137/516.25; 137/855
[58] Field of Search .......... 137/512.4, 516.11, 516.13, 137/516.15, 852, 855-859, 854, 512.15

[56] References Cited
U.S. PATENT DOCUMENTS
1,633,772   6/1927   Clapp .................................. 137/512.4
3,123,095   3/1964   Kohler .................................. 137/856 X FOREIGN PATENT DOCUMENTS
1500015   5/1969   Fed. Rep. of Germany ...... 137/516.15
996040   6/1965   United Kingdom ................. 137/516.13

Primary Examiner—Robert G. Nilson
Attorney, Agent, or Firm—Watson, Cole, Grindle & Watson

[57] ABSTRACT

A closing plate for a ring valve, in particular a suction or pressure valve of a piston compressor, which is intended to be arranged on a valve seat with arcuate-shaped through-flow passages and comprises at least one concentric ring and at least one concentric sectioned ring which control the through-flow passages, and at least one concentric ring and at least one concentric sectioned ring are connected with each other through radial arms. One of the rings is continuous and adapted to be clamped on the valve seat at at least two points, while at least one other ring is split by radial slits between the radial arms to form the at least one concentric sectioned ring.

9 Claims, 4 Drawing Figures

U.S. Patent     Aug. 14, 1979     4,164,238

CLOSING PLATE FOR A RING VALVE

This is a continuation, of application Ser. No. 738,269 filed Nov. 2, 1976, and now abandoned.

This invention relates to a closing plate for a ring valve, in particular a suction or pressure valve of a piston compressor, which is intended to be arranged on a valve seat with arcuate shaped through-flow passages and comprises at least one concentric ring and at least one concentric sectioned ring which control the through-flow passages, which rings are connected with each other through radial arms.

Suction or pressure valves, above all in large piston compressors, are usually constructed as ring plate valves with concentrically arranged ring-shaped through-flow passages. The ring valves are simpler to produce than valves with linear through-flow passages, since both the constitutent parts of the valves and the respective mating surfaces in the compressor can be finished by turning on a lathe. Apart from that, ring plate valves by virtue of their concentrically arranged through-flow passages distinguish themselves by a relatively good use of their area for the through-flow.

The so-called tongue or leaf valves with tongues or leaves of a linear configuration are on the other hand more simply constructed, since they require no separate springing and no measures for shock damping. Through the rigid clamping of the tongues or leaves at one end, these valves work in a relatively soft and frictionless manner.

Different measures are known for achieving an elastic working of the ring plate valves and thereby to imitate the tongue or leaf valves. Alongside elastic connectors for frictionless guiding, until now closing plates have been used with connecting arms extending over only one diameter of the plate together with a springing limited to only one diameter. In another known form the radial connecting arms of the closing plate are extensively separated by means of oblique slits, whereby together with a special springing a soft working is simultaneously achieved. All properties of the tongue or leaf valves can however not be achieved by this means.

It is an object of the invention to provide a closing plate for a ring valve in such a form that functioning similar to that of a tongue or leaf valve will be achieved, without losing the significant advantages of the ring valve.

According to the present invention, there is provided a closing plate for a ring valve, the plate comprising at least one concentric ring and at least one concentric sectioned ring for controlling arcuate-shaped through-flow passages in the valve seat of the valve and a plurality of radial arms interconnecting the at least one concentric ring and the at least one concentric sectioned ring, wherein at least one of the rings is continuous and adapted to be clamped on the valve seat at least at two points and at least one other sectioned ring is split by a respective radial slit.

The present invention also provides a ring valve including such a closing plate.

Through this construction a comparatively cheap ring valve with frictionless guiding of the closing plate is achieved, which valve combines the known advantages of the leaf valve with almost the same large flow area of the previously known plate valves.

The separating into the concentric sectioned rings of of ring plates by slits extending in the radial direction has been until now known only in spring or damping plates, in order to arrive at spring tongues with free ends, which can be bent out of the level of the plate, or alternatively to reduce the stiffness of dished plate springs. This measure is often used also with cylindrically dished spring plates, in order to arrive at softer springs. On the other hand the invention is concerned with the construction of the closing plate of a ring valve, whereby the radial slits are envisaged in those regions of the sectioned rings which close the through-flow passages of the valve seat.

If according to a further feature of the invention the outermost plate ring is continuous and all inner plate sectioned rings separated through radial slits, the inner ring sections can perform the complete stroke of the plate, since the comparatively long outlying ring is correspondingly soft and the stroke of the plate between the tensioned position and the end stop can easily be bridged. The inner sectioned rings can in any case practically completely open the valve under the influence of the flow of the controlled medium. As a result of the soft working of this valve, the maximum stroke of the inner sectioned rings can moreover if required be larger than the stroke of a comparable ring plate valve.

A preferred embodiment of the inventive valve consists in that a complete plate ring is held fast at two diametrically opposite positions on the valve seat and a connecting arm extends radially inwards from the middle of each of the semi-circular sections defined thereby, which simultaneously carry approximately semi-circular separated ring sections. By this means the outermost ring is only held fast at two diametrically opposite positions and the individual sectioned rings of the concentric rings extend over an angle of 90° therefrom so that they are long and correspondingly soft, which has an advantageous effect on the desired elastic mode of working of the valve.

The two clamping points of the complete plate ring can in a further embodiment of the invention however also be connected together through a diametrically extending arm, which preferably lies fast against the valve seat and is sealed therewith. This construction offers the possibility of using one half of the ring plate as a closing plate for the suction valve and the other half for the pressure valve of a piston compressor, so that only a single closing plate is necessary, as is known per se in compressor valves. The bridging radial arm of the inventive closing plate thus separates the pressure space from the suction space of the valve.

Further features and advantages of the invention are apparent in the accompanying drawings, in which two examples of embodiment of the invention are shown.

Figure 2:
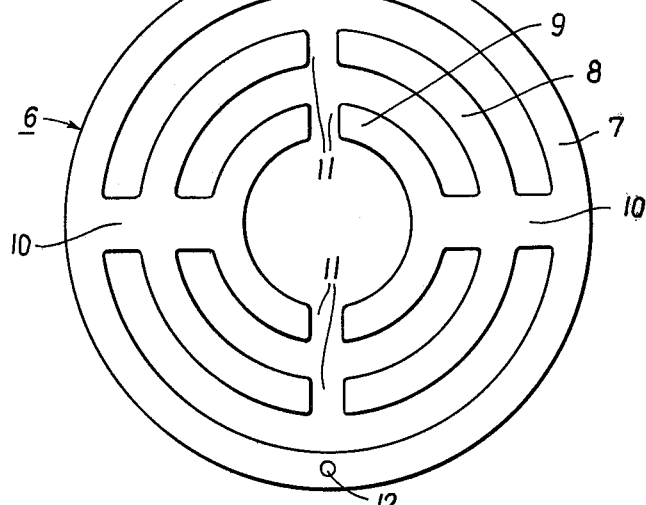
Figure 3:
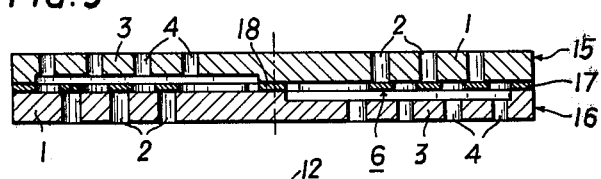
Figure 4:
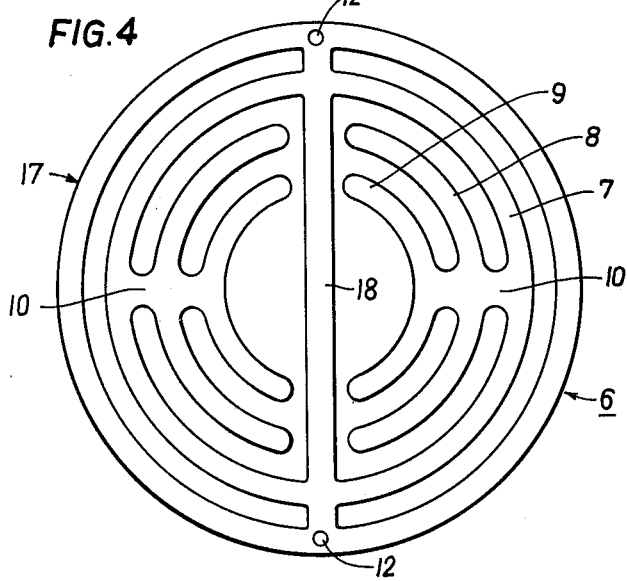

FIG. 1 shows a ring valve with closing plate in central axial section;

FIG. 2 the corresponding closing plate is shown in plan view;

FIG. 3 shows a further embodiment of the ring valve in central axial section; and FIG. 4 shows the closing plate thereof in plan view.

The ring valve shown in FIG. 1 comprises a valve seat 1 with through-flow passages 2 and a catcher 3 with through-flow passages 4. At their circumference the valve seat 1 and catcher 3 are held apart from each other by a sealing ring 5. In the space defined therebetween is located a closing plate 6. If necessary, an additional means for holding apart of the valve seat 1 and catcher 3 can be provided in the centre of the valve, for example a supplementary disc.

The closing plate 6, which is shown in FIG. 2, comprises concentric ring 7 and sectioned rings 8 and 9 arranged within one another and connected together by radial arms 10. The outermost plate ring 7 is continuous, whereas the two inner sectioned plate rings 8 and 9 are split in the middle of each section thereof between the arms 10 by slits 11. Two bores 12 are provided in the continuous ring 7 at opposite ends of the diameter of the plate passing through the slits 11 which bores serve for anchoring of the closing plate 6 in the valve. All the arms 10 lie on one plate diameter, which extends perpendicular to the diameter passing through the bores 12 and slits 11.

In the valve of FIG. 1, the closing plate 6 of FIG. 2 is held fast on the valve seat 1. In order to provide for the correct installation position, pins 13 are anchored in the valve seat 1 in the clamping position, and are received in the bores 12 in the closing plate 6. Protrusions of the catcher 3, or resilient elements 14 provided between the catcher and the closing plate 6 in the region of the bores 12, urge the closing plate 6 against the valve seat 1.

If during working of the valve compressed gaseous medium passes through the passages 2 to the closing plate 6, the sectioned plate rings 8 and 9 lift to a complete extent, and the plate ring 7, with the exception of the anchoring points in the region of the bores 12, lifts over a major part of its length, from the valve seat 2 to lie against the catcher 3. The relatively long ring sections of the outermost plate ring 7 which lie between the bores 12 thereby bridge the space between the catcher 3 and the anchoring points on the valve seat 1.

The semi-circular sections of the sectioned rings 8 and 9 formed by the radial slits 11, which are only connected to the complete outer plate ring 7 through the arms 10, are considerably elastic and move over the entire stroke of the plate. The valve shown in FIGS. 1 and 2 has the appearance of a conventional plate valve, but the closing plate of FIG. 2 works despite this in a considerably soft and elastic manner like a tongue or leaf valve.

The ring valve shown in FIGS. 3 and 4 is in the form of a combined valve assembly which includes a suction valve and a pressure valve. As is apparent from FIG. 3, two disc-shaped valve members 15 and 16, which can be of identical construction, are arranged one above the other and a closing plate 6 as shown in FIG. 4 is clamped therebetween. The left half of the valve in FIG. 3 thus for example forms a pressure valve and the right half a suction valve. The left half of the valve member 16 therefore forms the valve seat 1 of the pressure valve with through-flow passages 2, and the left half of the valve member 15 serves as a catcher 3 with through-flow passages 4. In the right half of FIG. 3 the situation is reversed. There the valve seat 1 of the suction valve with through-flow passages 2 lies above and the catcher 3 with through-flow passages 4 underneath.

The closing plate 6 shown in FIG. 4 also comprises concentric plate rings and concentric sectioned plate rings. The outermost plate ring 17 is however, as shown in FIG. 3, clamped fast between the two valve members 15 and 16 and serves therefore only for anchoring of the closing plate 6 and for sealing between the two valve members 15, 16. The effective closing plate is formed by the inner plate ring 7 and sectioned rings 8 and 9 which are connected together through arms 10 and otherwise are constructed in similar manner to the closing plate 6 shown in FIG. 2. In contrast thereto the closing plate according to FIG. 4 is provided with an additional diametrically extending arm 18, which extends between the two anchoring points in which the bores 12 are provided for location. The arm 18 is clamped between the two valve members 15 and 16 and forms a seal between the pressure valve provided on the left and the suction valve arranged on the right.

Thus the ring valve shown in FIGS. 3 and 4 fulfills the same purpose as a conventional concentric plate valve, in which the known suction and pressure valves are arranged concentrically inside one another. The difference however lies in that with a valve according to FIGS. 3 and 4 the approximately semi-circular ring 7 and sectioned rings 8 and 9 work in an elastic and soft manner like a tongue or leaf valve and special measures for guidance, springing and shock damping for the closing plate are not necessary. Thus a valve which is simple and cheap to produce is achieved, which despite this exhibits an advantageous mode of operation and a relatively large through-flow area.

Several variations and departures from the examples of embodiment described are possible within the scope of the invention. In particular, and above all with large valves, several connecting arms extending diametrically of the plate between the plate rings and sectioned plate rings may be envisaged, so that instead of the bisection of the closing plate in the examples described, a division into three may be provided. The radial separating slits may correspondingly be arranged on three plate radii. It is furthermore also possible, as with known tongue or leaf valves, instead of a complete catcher plate, merely to provide end stops at the free ends of the semi-circular ring sections 8 and 9 or also in the region of the arms 10. The sectioned rings 8, 9 can also advantageously be connected with each other at their free ends or in the region thereof through additional radial arms, for example to allow the closing plate to be more easily opened through a regulating device.

I claim:
1. A closing plate for a ring valve mountable on a valve seat with through-flow passages, comprising:
   at least one concentric plate ring and at least one radially spaced concentric sectioned plate ring for controlling the through-flow passages;
   radially extending arms interconnecting said at least one concentric ring and said at least one radially spaced concentric sectioned plate ring;
   one of said at least one concentric plate ring being continuous and said at least one sectioned ring being separated by radial slits;
   said at least one continuous ring including spaced points for mounting on said valve seat with the ring portions between said spaced points being flexible;
   said radial arms extending from a flexible portion of said at least one continuous ring and passing between said spaced points, said radial arms supporting the ring sections of said at least one sectioned ring separated by slits.

2. A closing plate as in claim 1 wherein there are two diametrically opposed spaced points and there are two radial arms extending inwardly from respective points on said at least one continuous ring substantially midway between said two spaced points.

3. A closing plate as in claim 2 wherein the slits separating at least one of said sectioned ring sections are aligned on the same diameter as said spaced points, said radial arms interconnecting said ring sections extending on a diameter disposed at right angles to the diameter common to the said spaced points and said slits.

4. A closing plate as in claim 3 further comprising an additional arm extending diametrically between said spaced mounting points.

5. A closing plate as in claim 4 wherein there are two continuous plate rings and a number of sectioned plate rings separated by radial slits.

6. A ring valve comprising the closing plate of claim 4 and two valve members arranged one above the other and divided diametrically into two halves to form valve seats and valve cages in a suction valve and a pressure valve, respectively, said closing plate being mounted between said two valve members, said continuous ring and said additional arm being clamped between said two valve members and said additional arm forming a seal between said suction and pressure valves.

7. A closing plate as in claim 1 wherein said continuous ring is the outermost ring, and there are a number of sectioned plate rings separated by radial slits.

8. A closing plate as in claim 7 wherein said continuous ring includes bores defining said spaced points for location of the closing plate on the valve seat.

9. A ring valve comprising a valve seat with a plurality of through-flow passages and a closing plate according to claim 1.

* * * * *